United States Patent [19]

Focqueur et al.

[11] Patent Number: 4,763,766
[45] Date of Patent: * Aug. 16, 1988

[54] CONTROL LINKAGE FOR COUPLING DEVICE

[75] Inventors: Hervé Focqueur, Franconville; Bernard Jumel, Pierrefitte, both of France

[73] Assignee: Valeo, Paris, France

[*] Notice: The portion of the term of this patent subsequent to Jun. 9, 2004 has been disclaimed.

[21] Appl. No.: 845,619

[22] Filed: Mar. 28, 1986

[30] Foreign Application Priority Data

May 5, 1985 [FR] France ................................ 85 05252

[51] Int. Cl.⁴ ............................................. F16D 13/75
[52] U.S. Cl. .................................... 192/99 S; 74/516; 192/111 A
[58] Field of Search .................. 192/111 A, 99 S; 74/516

[56] References Cited

U.S. PATENT DOCUMENTS

| | | |
|---|---|---|
| 3,250,357 | 5/1966 | Zeidler ............................ 192/111 A |
| 4,263,999 | 4/1981 | Fasano ........................... 192/111 A |
| 4,266,649 | 5/1981 | Falzoni ........................... 192/111 A |
| 4,515,029 | 5/1985 | Reynolds et al. ............. 192/99 S X |
| 4,671,400 | 6/1987 | Grunberg et al. ............. 192/111 A |

FOREIGN PATENT DOCUMENTS

| | | |
|---|---|---|
| 2449434 | 4/1975 | Fed. Rep. of Germany ... 192/111 A |
| 2094619 | 2/1972 | France . |
| 2444972 | 7/1980 | France . |
| 2544428 | 10/1984 | France . |
| 1080815 | 8/1967 | United Kingdom . |

Primary Examiner—Rodney H. Bonck
Attorney, Agent, or Firm—Charles E. Brown; Charles A. Brown

[57] ABSTRACT

A control linkage for a coupling device such as a clutch is designed to be coupled to an operating device. It comprises an output lever and, associated with and generally aligned with the output lever, a wear compensator. This comprises an actuator lever pivoted to the output lever and adapted to be constrained to pivot with the output lever by disengagable detent device. The detent device is operative through a demultiplier lever pivoted to the actuator lever and coupled to the output lever by a lost motion connection.

16 Claims, 4 Drawing Sheets

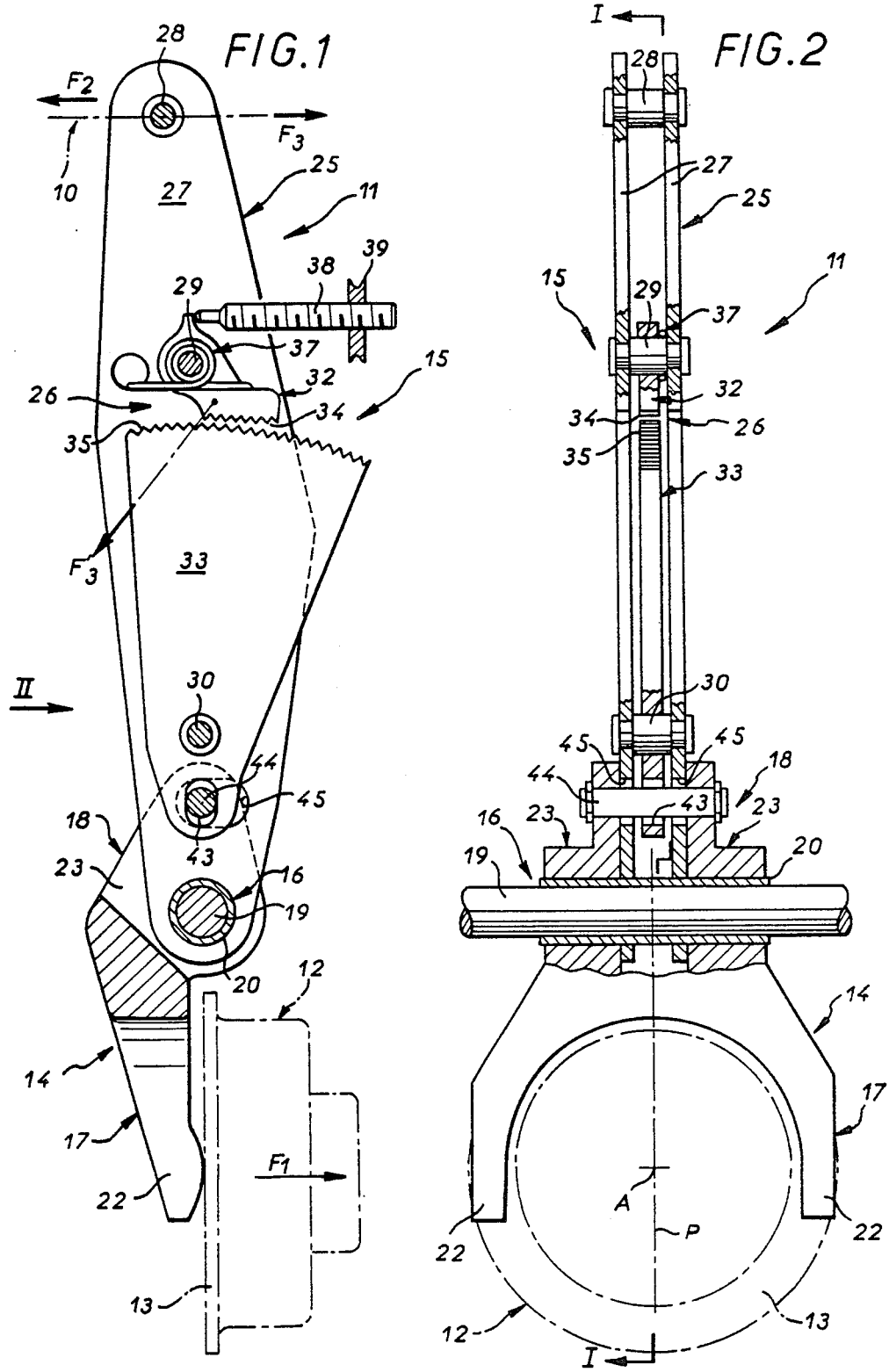

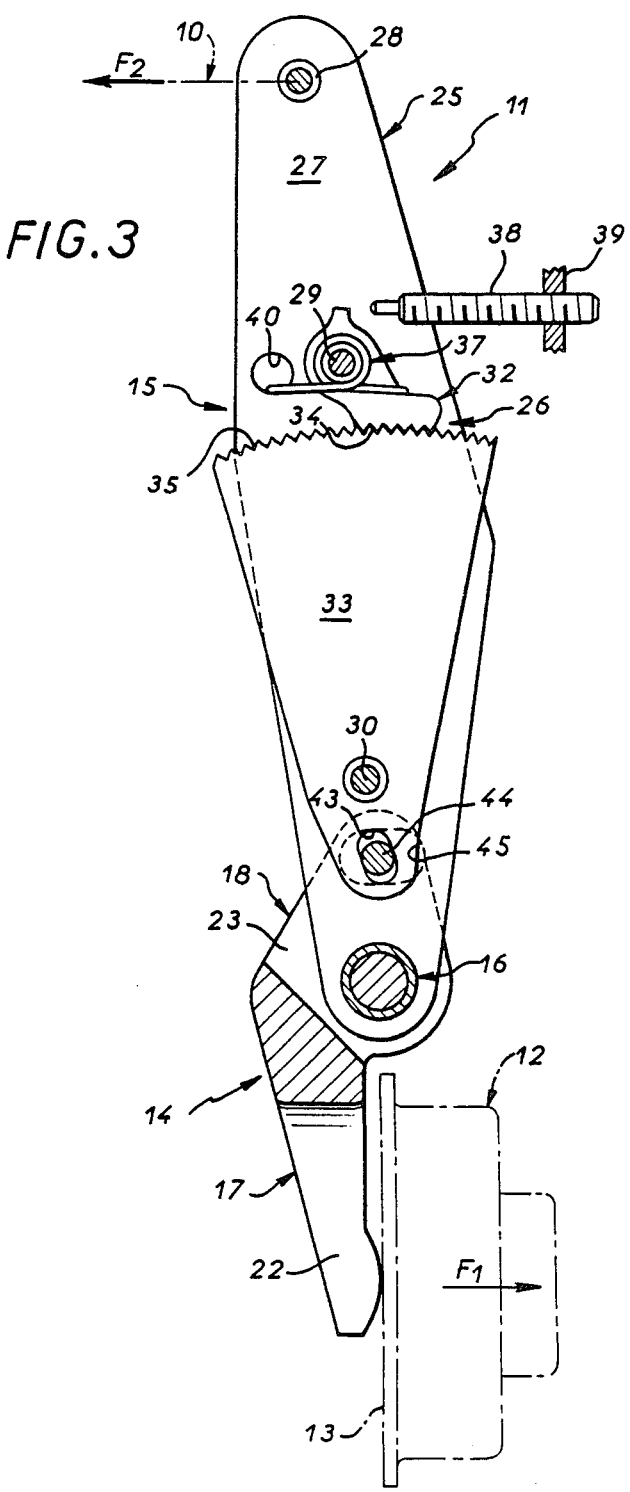

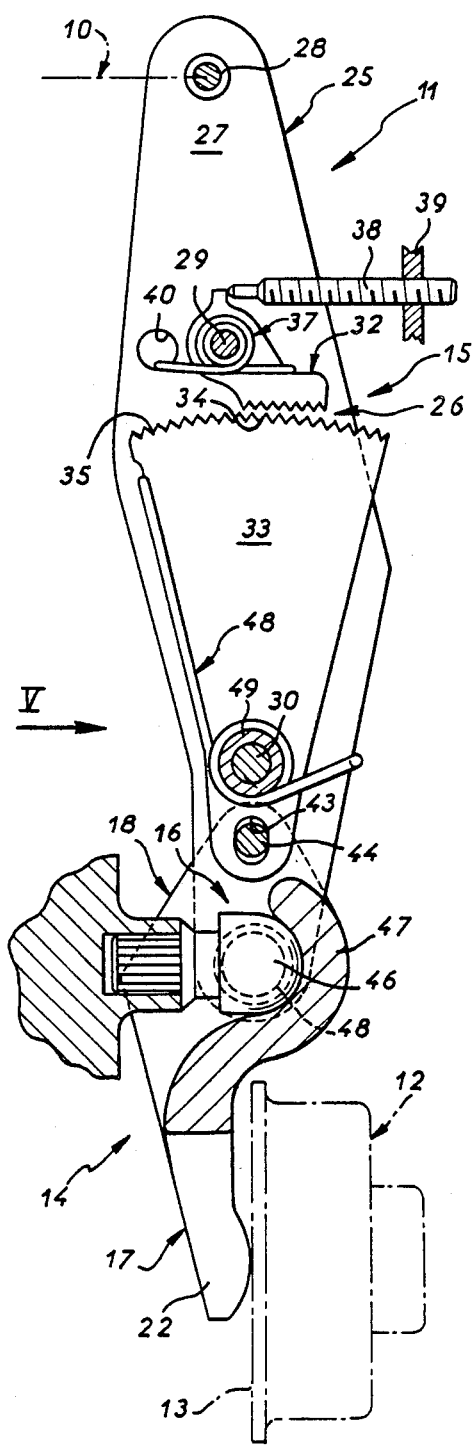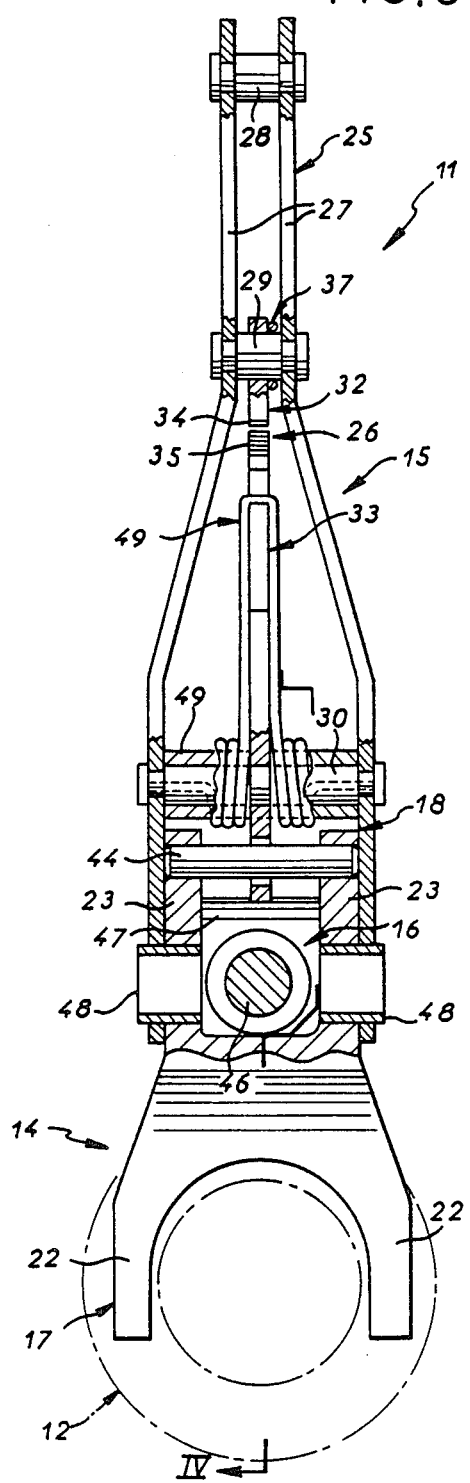

CONTROL LINKAGE FOR COUPLING DEVICE

The present invention is generally concerned with controling any form of coupling device and is more particularly directed to the case where the coupling device is a clutch, in particular a clutch for automobile vehicles.

As is known, the clutch of an automobile vehicle is normally engaged with the friction disk clamped between a pressure plate and a reaction plate; in order to release it, in other words to unclamp its friction disk, it is actuated by a control member operated by the user, in practise a foot-pedal, a control linkage extending for this purpose between the control member and an actuator member, usually called the clutch release bearing, adapted to operate on the clutch release device that any clutch usually comprises for procuring such disengagement.

As is also known, the control linkage thus used between the control member and actuator member is adapted to be coupled to operating means controled by said control member and usually comprises as its output element a lever, usually called the clutch release yoke, pivoted to a support and adapted to act on the actuator member, and is in this way adapted to actuate the coupling device to be controled.

When, as in the case of a clutch, the coupling device utilizes friction facings, these are subject to wear in service.

There results an unwanted progressive change in the idle position of the actuator member and therefore an increase in the movement required of the control member to change from the engaged state to the disengaged state of the controled coupling device.

To alleviate this problem it has already been proposed to incorporate into the corresponding control linkage, on the upstream side of the lever forming the output element thereof, hereinafter referred to for convenience only as the output lever, a wear compensator.

This is the case, for example, in French patent application No. 70.23840 filed June 26, 1970 and published under the number 2.094.619, and in U.S. patent application Ser. No. 700,896, now U.S. Pat. No. 4,671,400.

At present, the output lever of the control linkage (in practise, in this case of controling a clutch, the clutch release yoke) is more often than not offset laterally relative to the remainder of the control linkage, and in particular relative to the associated wear compensator.

Although an arrangement such as this can give satisfaction, it has the disadvantage of applying torsional stress to the shaft linking the output lever and the wear compensator and of being suitable in practise only for specific applications meeting various constraints as to the positioning of the output lever and the wear compensator.

In British Patent No. 1.080.815, however, the wear compensator is generally aligned with the output lever of the control linkage concerned, said wear compensator itself comprising a lever, or actuator lever, which is pivoted to said output lever and adapted to be fastened thereto through the intermediary of disengable snap-fastener means.

Apart from the fact that the implementation proposed in this British patent is relatively complex, requiring in the case of a clutch control system a special clutch release yoke, and the fact that is uses a large number of parts (notably, over and above the actuator lever of the wear compensator and the output lever forming the output element of the whole, a third lever adapted to be coupled to the operating means concerned and which thus forms the input element of the whole), the problem arises of achieving satisfactory demultiplication for the wear compensator, needed for achieving fine wear compensation and thus precise operation.

A general object of the present invention is an arrangement enabling this requirement to be satisfied in a simple and effective manner with a minimal number of parts.

More precisely, the object of the present invention is a control linkage for a coupling device, such as a clutch, for example, which, adapted to be coupled to operating means, is of the kind comprising a lever, hereinafter referred to as the output lever, which forms its output element and, associated with said output lever and generally aligned therewith, a wear compensator, said wear compensator itself comprising a lever, hereinafter referred to as the actuator lever, which is pivoted to the output lever and adapted to be constrained to rotate therewith through the intermediary of disengagable detent means, the control linkage being generally characterized in that the detent means are operative through the intermediary of a demultiplier lever which is pivoted to the actuator lever and which is coupled to the output lever by a lost motion connection.

In practise, and in a particularly advantageous manner, the demultiplier lever wear compensator in accordance with the invention is to some extent integrated with the output lever.

Apart from the fact that an arrangement of this kind minimizes the number of parts to be used and avoids any torsional stress on the corresponding shaft, in the case of controling a clutch it favors the adaptation of the whole to highly diversified vehicle types, independently of the operating means employed, the clutch release yoke that constitutes the output lever in this case advantageously having something in common with a usual type clutch release yoke.

The characteristics and advantages of the invention will emerge from the following description given by way of example with reference to the accompanying diagramatic drawings in which:

FIG. 1 is a view in elevation and cross-section on the broken line I—I in FIG. 2 of a control linkage in accordance with the invention, for the engaged state of the controled coupling member;

FIG. 2 is a lateral view of the control linkage in the direction of the arrow II in FIG. 1;

FIG. 3 is a view analogous to that of FIG. 1 showing the operation of the wear compensator fitted to the control linkage;

FIG. 4 and 5 are views respectively analogous to FIGS. 1 and 2, relating to an alternative embodiment of the control linkage in accordance with the invention;

Figure 6:
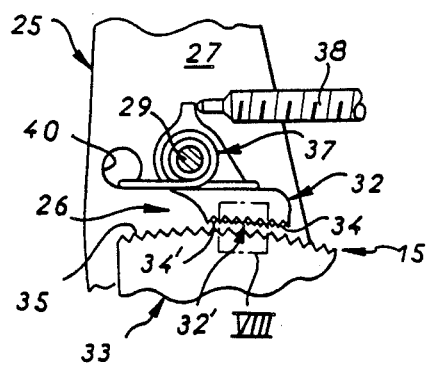
FIGS. 6 and 7 are views respectively analogous to parts of FIGS. 1 and 2, relating to another embodiment.

As schematically shown in these figures, it is a question of operating means 10 that operate on an actuator member 12 itself adapted to operate on the coupling device (not shown) to be controled via a control linkage 11.

The operating means 10 may be of any kind and this is whey they are shown only schematically by a chain-dotted line in FIG. 1.

They may consist, for example, of a cable, a rod or the piston of a hydraulic ram.

Be this as it may, they are controled by a control member operated by the user.

When as in this instance the coupling device to be controled is a clutch, the actuator member 12, shown only schematically by its contour in the figures, is a clutch release bearing.

As a clutch release bearing of this kind does not of itself form part of the present invention it will not be described here.

It will suffice to indicate that, in the embodiment shown in FIGS. 1 through 3, it is a "push" type clutch release bearing, that is to say a clutch release bearing adapted to apply thrust to the clutch release device of the clutch to be controled, in the direction of the arrow F1 in FIG. 1, and that, for operation of the control linkage 11 in the corresponding direction, it features a radial flange 13.

In the embodiment shown the flange 13 is circumferentially continuous, but it may equally well be reduced to two arms or fingers at diametrally opposed positions relative to each other.

In a manner known per se, the control linkage 11 in accordance with the invention, which is adapted to be coupled to the operating means 10, in practise in a direction which, as shown schematically by the arrow F2 in FIG. 1, is opposite that in which the actuator member 12 is adapted to apply thrust to the coupling device to be controled when, as shown, the operating means 10 is assumed to operate in traction, is of the kind comprising, on the input side of a lever 14 forming its output element, said output element being that through which it is itself adapted to act on the actuator member 12, a wear compensator 15.

As shown, the wear compensator 15 is generally aligned with the lever 14 forming the output element of the control linkage 11, said lever 14, hereinafter referred to for convenience only as the output lever, broadly speaking forming an extension of said wear compensator 15.

In practise the output lever 14 is pivoted to a support 16 and is in one piece with two arms each of which lies on a respective side of said support 16; through one arm 17, hereinafter referred to for convenience only as the actuator arm, it is adapted to act on the coupling device to be controled through the intermediary of the actuator member 12; the wear compensator 15 is coupled to the other arm 18, hereinafter referred to for convenience only as the operating arm.

In the embodiment specifically shown in FIGS. 1 through 3, the support 16, in a manner which is known per se, consists of a fixed pin 19 surrounded locally by a bearing 20.

In this embodiment, and in a manner which is also known per se, the actuator arm 17 of the output lever 14, usually called the clutch release yoke when the coupling device to be controled is a clutch, forms a yoke whose fingers 22 bracket the corresponding pin in order to act on said actuator member 12.

This pin is schematically shown by the position of its axis A in FIG. 2, this axis A being that along which the actuator member 12 moves to operate on the coupling device to be controled.

In the embodiment shown, and in accordance with one aspect of the invention, the operating arm 18 of the output lever 14 itself forms a yoke the two fingers 23 of which, and this applies also to the fingers 22 of the associated actuator arm 17, extend one on each side of the plane P which, passing through the aforementioned axis A as schematically represented in chain-dotted line in FIG. 2, is perpendicular to the shaft 19, this plane P in practise constituting a plane of symmetry for the assembly.

Thus the overall configuration of the output lever 14 is in the shape of an H.

The wear compensator 15 itself comprises a lever 25, hereinafter referred to for convenience only as the actuator lever, which is adapted to be coupled to the operating means 10, pivoted to the output lever 14, more precisely to the operating arm 18 thereof, and adapted to be constrained to rotate with the output lever 14 through the intermediary of disengagable detent means 26.

In the embodiments shown and in accordance with one aspect of the invention the actuator lever 25 is formed by two parallel flanges 27 which have exactly the same contour and each of which is associated with one of the two fingers 23 of the yoke formed by the operating arm 18 of the output lever 14.

For fastening them together the flanges 27 which in this way constitute the actuator lever 25 are connected together by three spacers 28, 29 and 30 staggered along their length.

In practise these spacers each comprise a shouldered barrel between the flanges 27 and, at each end of this shouldered barrel, tails of smaller diameter each passing through the corresponding flange 27 and riveted over beyond the latter.

In the embodiment specifically shown in FIGS. 1 through 4, the flanges 27 which thus constitute the actuator lever 25 are parallel to each other over their entire length and they are conjointly engaged in the yoke formed by the operating arm 18 of the output lever 14, each lying against the corresponding inside surface of the respective finger 23 of this yoke.

As a result the spacers 28, 29 and 30 connecting the flanges 27 together are all identical.

The spacer 28 is in practise disposed near the end of the flanges 27 opposite the operating arm 18 of the output lever 14.

It is through the intermediary of this spacer that the actuator lever 25 that they form and thus the linkage 11 is adapted to be coupled to the operating means 10.

The spacer 29 is disposed between the two ends of the flanges 27 and the spacer 30 is disposed at a short distance from the end through which the flanges 27 are pivoted to the operating arm 18 of the output lever 14.

In practise, the flanges 27 are pivoted onto the bearing 20 surrounding the shaft 19 at a point beyond the spacer 30 relative to the intermediate spacer 29, forming with this bearing 20 the support 16 for the output lever 14.

In accordance with the invention, the detent means 26 are operative through the intermediary of a demultiplier lever 33 pivoted to the actuator lever 25 and coupled to the operating arm 18 of the output lever 14 by a lost motion connection.

In practise, they comprise at least one ratchet 32 pivoted to the actuator lever 25.

In the embodiments specifically shown in FIGS. 1 through 5 only one such ratchet 32 is provided.

In accordance with the one aspect of the invention this ratchet 32 and the demultiplier lever 33 both lie between the two flanges 27 forming the actuator lever 25.

The ratchet 32 has teeth 34 through which it can cooperate with a complementary toothed circular sector 35 provided for this purpose on the edge of the demultiplier lever 33 and is pivoted on the intermediate spacer 29 of the flanges 27, this spacer acting as a pivot pin for it.

As shown here, for improved bracing against the demultiplier lever 33 the ratchet 32 preferably lies, relative to the spacer 29 which forms its pivot pin, on the side of actuator arm 17 of the output lever 14 through which the actuator arm 17 is adapted to actuate the coupling device to be controlled, that is to say the side through which it is adapted to operate on the actuator member 12.

Be this as it may, the ratchet 32 is in practise acted on by a spring 37 which urges it at all times towards the teeth 35 on the demultiplier lever 33 and a stop 38 the position of which on a fixed support 39 is adjustable.

In the embodiments shown the spring 37 is a torsion string one end of which bears on the ratchet 32 and the other end of which is inserted into a hole 40 in one of the flanges 27 forming the actuator lever 25.

The demultiplier lever 33 is pivotally mounted on the actuator lever 25 by pivoting it on the spacer 30 connecting the flanges 27 forming this lever and, for its lost motion connection to the operating arm 18 of the output lever 14 a slot 43 at the end opposite the teeth 35, beyond said spacer 30 relative to said teeth 35, is engaged over a pin 44 which connects together the two fingers 23 of the yoke that the operating arm 18 forms and which is therefore carried thereby, this pin 44 itself passing with clearance through the flanges 27 forming the actuator lever 25 by means of slots 45 provided in them for this purpose.

Although the pin 44 is substantially in contact with the flanks of the slot 43 in the demultiplier lever 33 through which it passes, this slot 43 extending substantially radially relative to the support 16, it is spaced in all directions from the slots 45 in the flanges 27 forming the actuator lever 25, through which it also passes, so as never to interfere therewith.

As will be noted, the ratchet 32 and the demultiplier 33 forming the detent means 26 are substantially disposed in the axial plane of symmetry P of the assembly and the flanges 27 forming the actuator lever 25 are disposed substantially symmetrically, one on each side of this axial plane of symmetry P, parallel thereto, and thus one on each side of the axis A of displacement of the actuator member 12.

When the associated coupling device is in the engaged condition, the ratchet 32 bears against its abutment 38 at a distance from the teeth 35 on the demultiplier lever 33 (FIG. 1).

When, in order to change to the disengaged condition of the coupling device, the operating means 10 is to this end operative on the linkage 11, more precisely on the actuator lever 25 that these means comprise, in the direction of the arrow F2 in FIG. 1, the actuator lever 25, at this time free relative to the remainder of the linkage 11, initially pivots on its own about the support 16, entraining with it the demultiplier lever 33 which, because of the pin 44, then pivots about the spacer 30 until the ratchet 32, released by the stop 38, is interlocked with the demultiplier lever 33 because of the action of the spring 37 (FIG. 3).

From this moment towards the demultiplier lever 33 is constrained to rotate with the actuator lever 25 and, by virtue of the demultiplier lever 33 and the pin 44, the same goes for the output lever 14; on further actuation of the operating means 10 the output lever 14 then acts, as required, on the actuator member 12, in the direction of the arrow F1 in FIGS. 1 and 3.

When the coupling device concerned returns to the engaged state, the linkage 11 as a whole reverts to its initial position but, as the friction facings that the coupling device comprises wear away, and because of the retrograde thrust then exerted by the actuator member 12 on the output lever 14 and transmitted through the latter and the pin 44 to the demultiplier lever 33, the part of the teeth 35 on the demultiplier lever 33 with which the ratchet 32 is in line when idle moves gradually along the teeth 35, procuring the required wear compensation.

Because, in the arrangement as so far described, the support 16 for the output lever 14 comprises a pin, the linkage 11 may operate on the actuator member 12 equally well in its own direction (in thrust), as described above, as in the opposite direction, that is in traction.

This is not the case in the embodiment shown in FIGS. 4 and 5, where the support 16 comprises a ball-and-socket joint 46.

In this case it is only possible to act in one direction on the actuator member 12, in thrust, for example, as previously.

In this embodiment the middle part 47 of the output lever 14 is obviously shaped so as to cooperate in pivoting with the ball-and-socket joint 46 forming the support 16.

In this embodiment the flanges 27 forming the actuator lever 25 lie one on either side of the yoke formed by the operating arm 18 of this output lever 14, each lying against the corresponding outside surface of the respective finger 23 of this yoke.

In practise each of the fingers 23 then carries a short pin 48 on which the corresponding flange 27 of the actuator lever 25 is pivoted.

The flanges 27 are parallel to each other only at each end, the distance between them at the end opposite the output lever being less than the distance between them at the end where they cooperate with the output lever 14.

In this case the corresponding spacer 30 is therefore longer than the spacers 28 and 29.

Finally, in this embodiment, there is provided between the demultiplier lever 33 and the actuator lever 25 a spring 49 adapted to urge the output lever 14 continuously into bearing engagement against the actuator member 12 and thus to maintain the latter in contact with the coupling device to be controled at all times.

In the embodiment shown this is a torsion spring fitted over a bearing 49 surrounding the spacer 30 and one end of which bears on the demultiplier lever 33 whereas the other end bears on the actuator lever 25.

In all other respects the arrangements and operation are identical to what has been described previously.

Figure 7:
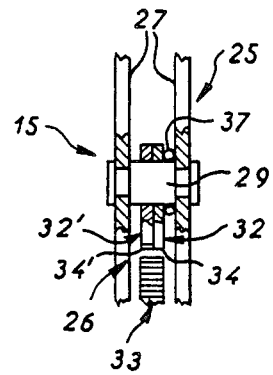
Figure 8:
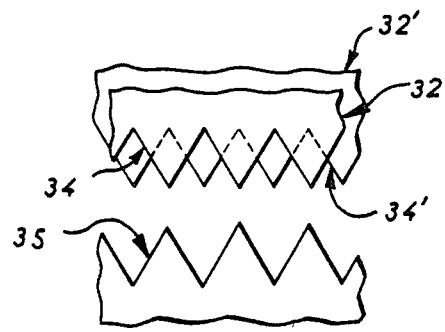
FIG. 8 is a view showing to a larger scale the detail of FIG. 6 indicated by the frame VIII thereon.

In the embodiment shown in FIGS. 6 through 8, two ratchets 32 and 32' are used, pivoted on the same pivot pin consisting, as previously, of the spacer 29.

The respective teeth 34 and 34' of the ratchets 32 and 32' are identical but they are circumferentially offset by one half-tooth relative to each other.

This arrangement reduces the risk of the teeth of one ratchet 32 or 32' contacting the top of the teeth of the associated demultiplier lever 33.

In such an eventually, the teeth of the other ratchet 32 or 32' are then sure to be correctly engaged with those of the demultiplier lever 33.

In the embodiment shown, the two ratchets 32 and 32' are superposed and are therefore in direct contact with each other.

It will be understood that the present invention is not limited to the embodiments described and shown, but encompasses any variant implementation and/or combination of the various component parts thereof.

In particular, the spring provided in the embodiment shown in FIGS. 4 and 5 to procure continuous bearing engagement between the output lever and the actuator member to be controlled may also be provided in the embodiment shown in FIGS. 1 through 3.

Also, if there is not already in the linkage a spring adapted to hold the ratchet 32 in bearing engagement against its stop 38 in the engaged state, so that it is properly disengaged from the demultiplier lever 33, a specific spring is preferably provided for this purpose.

For example, and as schematically represented by the arrow F3 in FIG. 1, this spring may be coupled to the spacer 28, being also coupled to the frame 39.

As an alternative and as schematically represented by the arrow F'3, it may be coupled slant-wise to the ratchet 32, for example; the spring 37 associated with the ratchet is then not needed, this spring also fulfilling this function.

Be this as it may, it will be noted that the control linkage in accordance with the invention as a whole advantageously has something in common with a conventional clutch release yoke, the wear compensator that it comprises being to some extent integrated into the arm of a yoke of this kind opposite that through which it is adapted to operate on an actuator member.

This is all the more so in that, designed to be coupled to the operating means concerned, the actuator lever that the wear compensator comprises advantageously forms of itself the input element of the control linkage in accordance with the invention as a whole.

Also, the actuator lever in particular may be more or less bent and/or the operating means concerned, instead of operating on it in traction, could equally well operate on it in thrust.

Moreover, the field of the application of the invention is not limited to "thrust" type clutch release bearings only, but on the contrary extends equally well to "pull" type clutch release bearings adapted to operate in traction and not in thrust on the clutch release device of the clutch to be controled.

There is claimed:

1. A control linkage for a coupling device such as a clutch, said control linkage being adapted to be coupled to operating means for the coupling device and comprising an output lever having a pivot axis and being cooperable with a release device for the coupling device, a wear compensator and said output lever having a substantially common axial plane of symmetry normal to said pivot axis, said output lever extending beyond said wear compensator, said wear compensator including an actuator lever adapted to be coupled to the operating means and pivotally connected to said output lever, releasable detent means for constraining said output lever to pivot with said actuator lever, said releasable detent means being connected to said output lever through a demultiplier lever, said demultiplier lever being pivotally connected to said actuator lever, and a lost motion connection between said demultiplier lever and said output lever.

2. A linkage according to claim 1, wherein said output lever is pivotally mounted on a support and includes two arms of a one-piece construction, said arms being disposed on respective sides of said support, one of said arms being a release arm cooperable with the release device, and the other of said arms being an operating arm coupled to said demultiplier lever through said lost motion connection.

3. A linkage according to claim 2, wherein said lost motion connection includes a pin carried by said operating arm of said output lever and slot means in said demultiplier lever receiving said pin, said slot extending generally radially relative to the pivot axis of said output lever on said support.

4. A linkage according to claim 2, wherein said output lever is of generally H-shaped configuration, and said release arm and said operating arm both being bifurcated.

5. A linkage according to claim 2, wherein a pivot pivotally connecting said actuator lever to said output lever is coaxial with said pivot axis around which said output lever is pivotally mounted on the support.

6. A linkage according to claim 3, wherein said operating arm of said output lever forms a yoke having two spaced apart fingers, said actuator lever of said wear compensator includes two spaced apart flanges in engagement with the respective yoke fingers, said pin of said lost motion connection interconnecting said yoke fingers, and said slot means of said lost motion connection includes a slot formed in each of said flanges of said actuator lever.

7. A linkage according to claim 2, wherein said operating arm of said output lever forms a yoke having two spaced apart fingers, and said actuator lever of said wear compensator having two spaced apart flanges in engagement with the respective yoke fingers.

8. A linkage according to claim 7, wherein a plurality of spacers fix said flanges together.

9. A linkage according to claim 7, wherein portions of said flanges are received between said yoke fingers.

10. A linkage according to claim 7, wherein said yoke fingers are received between portions of said flanges.

11. A linkage according to claim 7, wherein said flanges of said output lever are arranged symmetrically relative to a median plane of displacement of said actuator lever.

12. A linkage according to claim 7, wherein said demultiplier lever is disposed between said two flanges of said actuator lever.

13. A linkage according to claim 12, wherein said detent means includes a pawl pivotally mounted on said actuator lever and cooperable with ratchet teeth on said demultiplier lever, said pawl being disposed between said flanges of said actuator lever.

14. A linkage according to claim 13, wherein there are a plurality of spacers fixing said flanges together, said spacers including a first spacer proximate to a zone where said actuator lever is adapted to be coupled to the operating means, a second spacer pivotally mounting said pawl between said flanges, and a third spacer pivotally mounting said demultiplier lever between said flanges.

15. A linkage according to claim 12, wherein spring means biases said demultiplier lever to a rest position, said spring means includes a torsion spring having a central loop portion engaging said demultiplier lever and coil portions wound around a pivot pin pivotally mounting said demultiplier lever between said flanges.

16. A control linkage for a coupling device such as a clutch, said control linkage being adapted to be coupled to operating means for the coupling device and comprising an output lever having a pivot axis and being cooperable with a release device for the coupling device, a wear compensator generally aligned with said output lever, said output lever extending beyond said wear compensator, said wear compensator including an actuator lever pivotally connected to said output lever, releasable detent means for constraining said output lever to pivot with said actuator lever, said detent means including two pawls pivotally mounted on a single pin on said actuator lever, teeth on the respective pawls circumferentially offset relative to one another by one half tooth, said releasable detent means being connected to said output lever through a demultiplier lever, said demultiplier lever being pivotally connected to said actuator lever, and a lost motion connection between said demultiplier lever and said output lever.

* * * * *